United States Patent [19]
Allen

[11] 3,788,600
[45] Jan. 29, 1974

[54] GATE VALVE
[75] Inventor: Herbert Allen, Houston, Tex.
[73] Assignee: Cameron Iron Works, Inc., Houston, Tex.
[22] Filed: Aug. 24, 1972
[21] Appl. No.: 283,571

[52] U.S. Cl................. 251/214, 251/266, 251/326, 137/74
[51] Int. Cl...................... F16k 41/02, F16k 17/40
[58] Field of Search... 251/170, 174, 193, 195, 214, 251/264, 266, 267, 268, 269, 317, 326; 137/72, 74

[56] References Cited
UNITED STATES PATENTS
3,174,495  3/1965  Anderson et al. ............. 251/317 X
3,472,485  10/1969  Smith................................ 251/214

Primary Examiner—Martin P. Schwadron
Assistant Examiner—David R. Matthews
Attorney, Agent, or Firm—W. F. Hyer et al.

[57] ABSTRACT

There is disclosed a gate valve having a non-rising stem which is adapted to form a metal-to-metal seal with the valve bonnet to contain pressure therein upon destruction of the primary, rubber-like stem seal.

16 Claims, 7 Drawing Figures

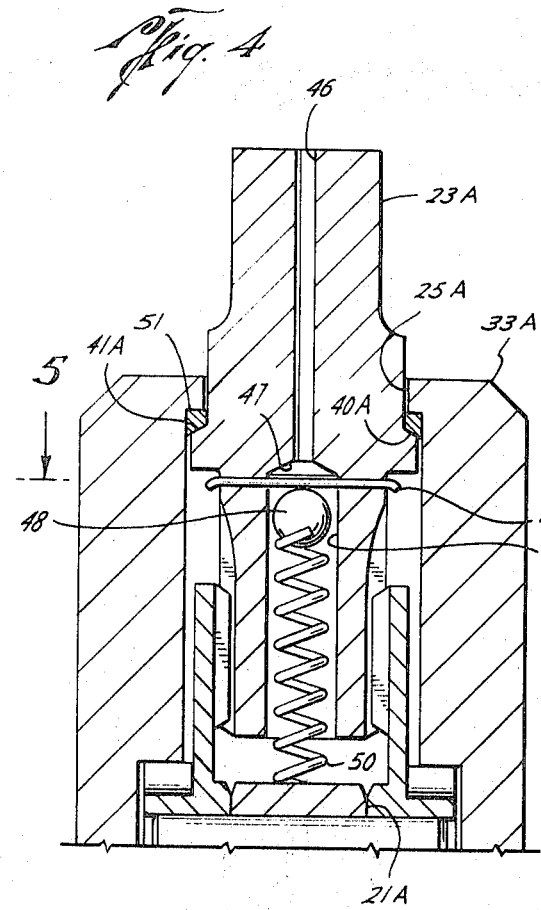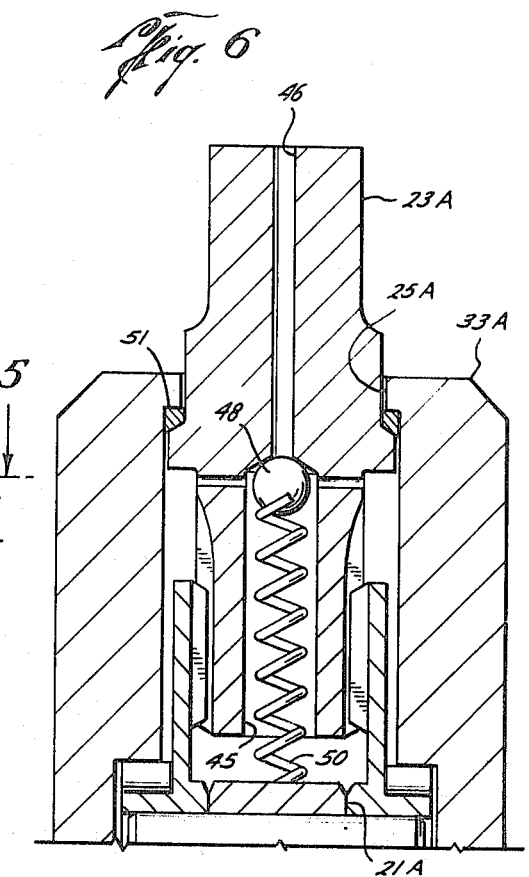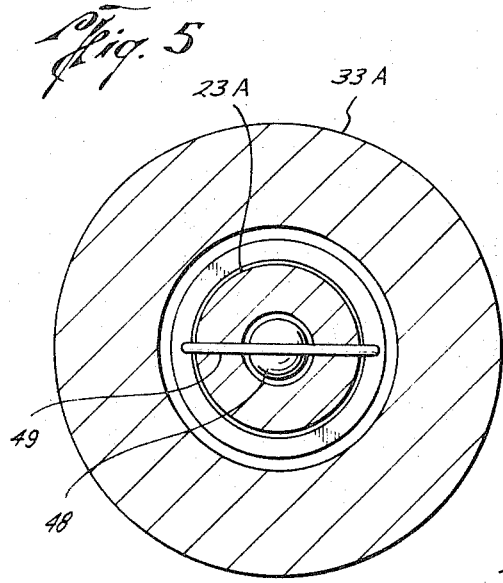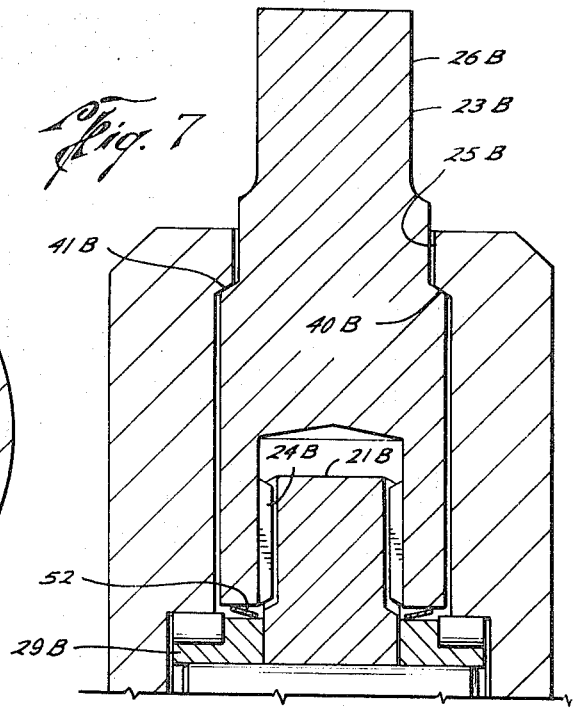

GATE VALVE

This invention relates generally to gate valves; and, more particularly, to improvements in gate valves of the type having non-rising stems.

In a valve of this type, such as that shown and described on page 1170 of the 1970–71 issue of the Composite Catalog of Oil Field Equipment and Services, the stem is threadedly connected to the gate and is held against axial movement by a thrust bearing in the bonnet, so that rotation of the stem transmits axial force to the gate for moving it between positions opening and closing the valve. A seal member of rubber-like material is carried in the bonnet to provide a seal about the stem, and provision is also made for venting the interior of the bonnet outwardly of the primary seal so as to prevent the build-up of excessive pressures within it. However, the high temperatures which may be encountered in the event of a fire near the valve may cause the rubber-like material to deteriorate and thus permit line fluid to leak past the stem and out of the valve.

Volpin U.S. Pat. No. 2,647,721 and Priese U.S. Pat. No. 3,177,887 show valves in which an effort is made to anticipate this problem by means of "fire seals" wherein the stem has a shoulder arranged to engage a shoulder on the bonnet and thereby form a metal-to-metal seal with the bonnet in the event of such a fire or other cause for critically high temperatures. More particularly, in each such valve, the stem shoulder is adapted to move into seating engagement with the bonnet shoulder upon fusion, at the destructive temperature level, of a part disposed between them. However, in the Volpin patent, the closure member is a plug which is fixed to the stem so that it must rise with the stem to form the fire seal; and, in the Priese patent, the closure member is a ball which has a tongue and groove connection with the stem so that the stem does not transmit axial force to the ball.

Thus, neither of these prior fire seal arrangements is suitable for a gate valve having a non-rising stem, and it is therefore an object of this invention to provide a non-rising stem type of gate valve having such a fire seal.

Another object is to provide a fire seal attachment which may be easily adapted to existing gate valves of the type above described.

A further object is to provide a gate valve as defined in one or both of the foregoing objects in which pressure build-up within the bonnet is avoided, during normal use, by a vent which is adapted to be closed when the destructive temperatures occur.

Still another object is to provide a gate valve as defined in the foregoing object wherein lubricant may be contained within the bonnet portion until such time as the fire seal is established.

These and other objects are accomplished, in accordance with the illustrated embodiments of the present invention, by a gate valve of the type described in which the stem comprises inner and outer sections, with the inner section being threadedly connected to the gate and the outer section having a splined connection to the inner section to permit relative axial movement therebetween and extending outwardly of the bonnet to provide an exterior part to which rotation may be imparted. A bearing means is provided in the bonnet for holding the inner stem section against axial movement, so that rotation of the stem causes the gate to move between opened and closed positions, and a primary seal member of rubber-like material is carried by the bonnet for sealing about the inner stem section, preferably beneath the bearing means, to contain the line fluid and protect the bearing means against damage from such fluid.

More particularly, there is an inwardly facing shoulder on the bore of the bonnet, and there is an outwardly facing shoulder on the outer stem section which is adapted to be urged against the bonnet shoulder so as to close off the interior of the bonnet and thereby contain line fluid therein upon destruction of the primary seal member due to excessively high temperatures. In certain embodiments of the invention, a means is provided for venting the interior of the bonnet during normal use, and then automatically closing the venting means in response to the excessively high temperatures, whereby fluid is contained within the valve despite destruction of the primary seal. In one such embodiment, a means fusible in the presence of such temperatures is disposed between the annular shoulders to space them apart. In another embodiment, there is a port through the outer stem section, a closure for the port which is urged toward port closing position, and a means for holding the closure from closing position which is fusible in the presence of said temperatures to permit said closure to be urged to said port closing position.

In still another embodiment of the invention, the bonnet is not normally vented, and instead spring means are provided for urging the stem shoulder against the bonnet shoulder to form the metal-to-metal seal therebetween. More particularly, in the preferred form of this embodiment, the spring means acts between the stem section.

In the drawings, wherein the like reference characters are used throughout to designate like parts:

FIG. 4 is a vertical sectional view of the upper end of the stem and bonnet of a valve constructed in accordance with the second-mentioned embodiment of the invention, and showing the closure thereof held by a fusible part in a position spaced from the port through the upper stem section to vent the interior of the bonnet;

FIG. 5 is a cross-sectional view of the stem and bonnet of FIG. 4, as seen along broken line 5—5 thereof;

FIG. 6 is a view similar to FIG. 4, but with the fusible part fused and the closure moved to a position closing the port; and FIG. 7 is a vertical cross-sectional view of the upper end of the stem and bonnet of a valve constructed in accordance with the third-mentioned embodiment of the invention.

Figure 1:
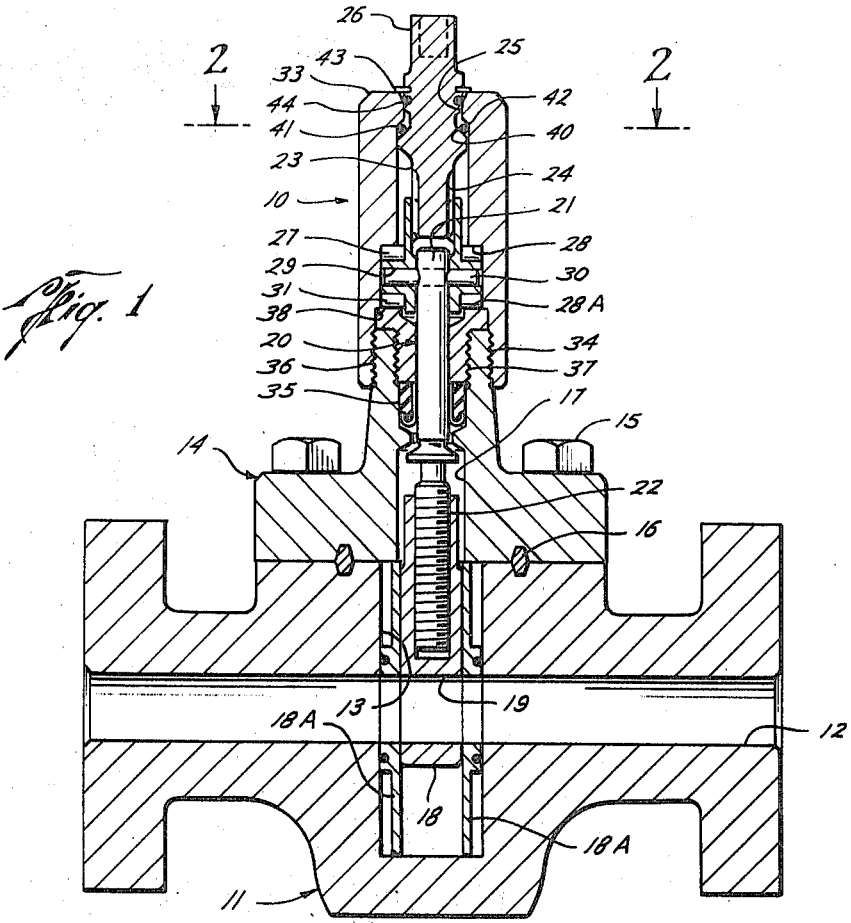
FIG. 1 is a vertical sectional view of a valve constructed in accordance with the first-mentioned embodiment of the invention, and showing the shoulder on the outer stem section spaced from the shoulder on the bonnet so as to vent the interior of the bonnet.
Figure 2:
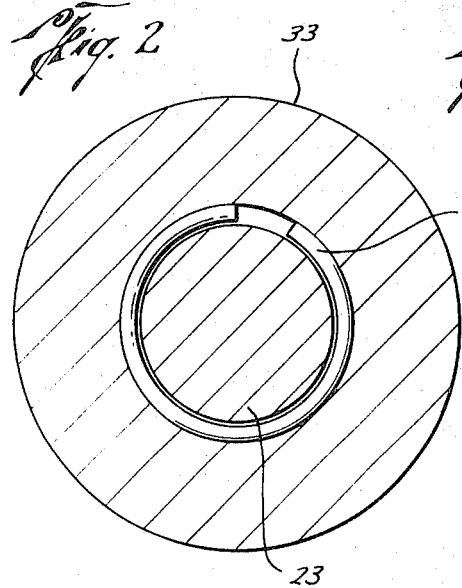
FIG. 2 is an enlarged cross-sectional view of the bonnet of the valve in FIG. 1, as seen along broken line 2—2, and showing the fusible part for holding the shoulders spaced apart.
Figure 3:
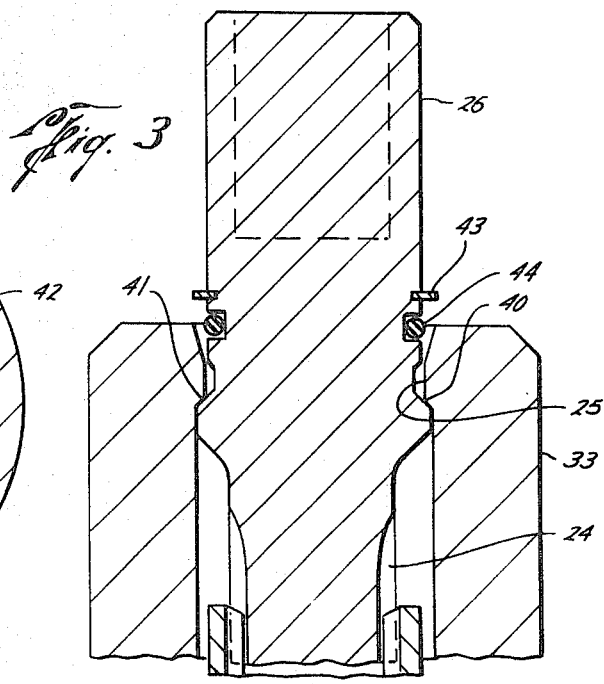
FIG. 3 is an enlarged vertical section of the upper end of the stem and bonnet of the valve of FIG. 1, but with the fusible part fused and the stem shoulder moved into seating engagement with the bonnet shoulder to close the venting means.

With reference now to the above-described drawings, and particularly the embodiment of the invention shown in FIGS. 1 to 3, the overall valve which is shown in FIG. 1, and indicated in its entirety by reference character 10, includes a valve body 11 having a flowway 12 therethrough and a chamber 13 therein intersecting the flowway and opening to the top side of the valve body. The valve also includes a bonnet 14 connected to the top side of the valve body by bolts 15 and sealed with respect thereto by a seal ring 16. With the bonnet so connected to the valve body, a bore 17 through it is aligned with the open end of the chamber 13.

A gate 18 having a port 19 therein is slidable vertically within the chamber between a position in which the port is aligned with the flowway 12 to open the valve, as shown in FIG. 1, and in which the port is beneath the flowway so as to close the valve. Retainer plates 18A are carried within the chamber 13 on opposite sides of the chamber.

A stem 20 rotatably mounted in the bore 17 of the bonnet includes an inner section 21 threadedly connected to gate 18 at 22 and an outer section 23 having a spline connection 24 to the inner section to form an extension thereof. The upper end of the upper stem section 23 extends through a hole 25 in the upper end of the bonnet to provide an exterior part 26 to which rotation may be imparted. Thus, with the inner stem section 21 held against axial movement in the bonnet, rotation of the stem extension will cause the gate to move vertically between flowway opening and closing positions.

As shown in FIG. 1, the lower stem section 21 is so held by means of roller bearings 27 and 31 on the upper and lower sides of a flange 29 on its upper end. The flange is releasably connected to the main portion of such stem section by a pin 30 and has an upper extension which forms a female portion of the spline 24. The upper bearings 27 are held down on the flange by a downwardly facing shoulder 28 on the bore of the bonnet, and the flange in turn holds the lower bearings 31 down on an upwardly facing shoulder 28A of the bonnet.

Bonnet 14 comprises a lower or base portion 32 having a flange through which the bolts 14 extend, a cap 33 threadedly connected at 34 to an upward extension from the flange of the bonnet section 32 and a nut 36 threadedly connected at 37 to the interior of the base portion. Shoulders 28 and 28A are formed on the cap 33 and nut 36, respectively, so that upon making up of the threads between the cap and the bonnet section 32, flange 29 on stem section 21 is held tightly between the bearings 27 and 31.

A seal member 35 of rubber-like material is held down within the bore of the bonnet section 32 by the nut 36 to provide a primary seal about the lower stem section 21. A shoulder 38 is formed on the inner diameter of the cap 33 above its threads 34 for bearing on the upper side of the nut 36 when both the nut and the cap are threadedly connected to the bonnet section 32. Thus, a seal is formed between shoulder 38 and the nut between the nut and the upper end of the upwardly extending portion of the bonnet section 32 to prevent leakage of line fluid from the interior of the bonnet through the threaded connection 34.

An inwardly or downwardly facing annular shoulder 40 is formed in the bore of the upper end of the cap 33, and a complementary outwardly or upwardly facing annular shoulder 41 is formed on the upper stem section 23 above the spline connection 24. In normal use of the valve, the upper stem section 23 is supported in the position of FIG. 1, in which its shoulder is beneath the bonnet shoulder, by means of a split ring 43 about the upper stem section for seating on the upper end of the bonnet. The stem shoulder is held spaced from the bonnet shoulder by means of a ring 42 disposed between them and formed of a relatively low melting point material, such as solder or plastic, which is relatively rigid as compared with rubber, but fusible at elevated temperatures which would destroy the rubber-like material of the seal member 35. Thus, as previously described, upon loss of the primary seal, ring 42 will fuse to permit the upper stem section to move upwardly to seat against the bonnet and thus form a metal-to-metal seal therewith to close the interior of the bonnet. That is, as shown, the upper stem section fits relatively closely within the bore of the bonnet beneath the fusible ring, so that pressure will be effective to urge it upwardly.

As best shown in FIG. 2, the ring 42 is discontinuous so that the interior of the bonnet is vented to the atmosphere trough the hole 25 in the upper end of the bonnet during normal use of the valve. However, upon fusing of the ring, the metal-to-metal seal between shoulders 40 and 41 closes off the interior of the bonnet to prevent loss of line fluid from the bonnet upon destruction of the primary seal 35.

As best shown in FIG. 3, an O-ring 44 is carried in a groove about the upper stem section above bonnet shoulder 41 and beneath the split ring 43. More particularly, this groove is formed in a cylindrical portion of the outer diameter of the upper stem section which fits relatively closely within the hole 25 through the upper end of the bonnet when the stem section is in its lower postion of FIG. 1. Thus, in this latter position of the stem section, the ring 44 engages the hole 25 with relatively light pressure which is sufficient to contain lubricant within the bonnet, but insufficient to contain fluid under high pressure. Thus, while containing lubricant, seal ring 44 does not prevent the high pressure fluids from venting.

The second embodiment of the valve of the present invention is identical to that of FIGS. 1 to 3 except with respect to the portions of the upper ends of its bonnet and stem illustrated in FIGS. 4 to 6. Thus, an inwardly facing annular shoulder 40A is formed on a ring 51 of bronze or other bearing material held in the upper end of the cap just beneath hole 25A therein. An upwardly facing annular shoulder 41A on an upper stem section 23A is urged into seating engagement with shoulder 40A in a manner to be described, so that the shoulders provide a metal-to-metal seal between the uper ends of the stem and bonnet, during use of the valve, both prior to and following destruction of the primary stem seal.

The upper stem section 23A is provided with a longitudinal bore 45 connecting with a port 46 leading to its upper end. A conical seat 47 is provided at the intersection of the stem bore and port, and a ball-shaped closure 48 is disposed within the stem bore for movement between a position opening the port to vent the interior of the bonnet to atmosphere, as shown in FIG. 4, and a position closing the port to close the vent, as shown in FIG. 6. Although the closure 48 is urged upwardly toward closed position by means of a coil spring 50 disposed between its lower side and the upper end of lower stem section 21A, it is held in open position, during normal use of the valve, by means of a pin 49 extending across the bore beneath the seat 47. This pin is made of a fusible material similar to that of ring 42 of the first-described embodiment, so as to be fusible at the elevated temperature which destroys the primary seal, thus permitting the closure to be urged upwardly by spring 50 into metal-to-metal sealing engagement with the seat 47 to close port 46 and the interior of the bonnet.

The valve constructed in accordance with the third-mentioned embodiment of the invention is also substantially identical to the valve of the first-mentioned embodiment, with the exception of the portions of the upper ends of its bonnet and stem illustrated in FIG. 7. Thus, an inwardly facing annular shoulder 40B is formed in the bore of the cap beneath a hole 25B therethrough in position to be engaged by a complementary annular shoulder 41B about an upper stem section 23B. As in the case of the second embodiment of the invention, the stem shoulder is urged upwardly into seating engagement with the shoulder 40B so as to provide a metal-to-metal seal between the stem and bonnet during use of the valve both prior to and following destruction of the primary seal. For this purpose, a spring washer is disposed between a flange 29B on a lower stem section 21B and the lower end of the upper stem section 23B. A spline connection 24B is formed between the upper and lower stem sections 23B and 21B. Although this embodiment provides no means for venting the interior of the bonnet during normal use of the valve, an exterior part 26B of the upper stem section 23B may be depressed if desired to periodically relieve excessive pressure within the bonnet.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a valve body having a flowway therethrough and a chamber therein intersecting the flowway and opening to one side of the valve body, a bonnet sealably connected to the valve body and having a bore therethrough aligned with the chamber opening, a gate slidable within the chamber between positions opening and closing the flowway, a stem rotatably mounted in the bore of the bonnet, said stem including an inner section threadedly connected to the gate and an outer section having a spline connection to the inner section to permit relative axial movement therebetween and extending through the outer end of the bonnet bore to provide an exterior part to which rotation may be imparted, a seal member of rubber-like material in the bonnet for sealing about the inner stem section, bearing means in the bonnet for holding the inner stem section against axial movement so that rotation of said stem causes the gate to move between flowway opening and closing positions, an inwardly facing annular shoulder on the bonnet bore, and an outwardly facing annular shoulder on the outer stem section for forming a metal-to-metal seal with the bonnet shoulder to close off the interior of said bonnet whereby fluid is contained therein in the event said seal member is destroyed.

2. A valve of the character defined in claim 1, including means for venting the interior of said bonnet, and means for closing said venting means in response to a temperature at which said seal member is destroyed.

3. A valve of the character defined in claim 2, wherein said venting means comprises means disposed between said annular shoulders and being fusible in the presence of said temperature to permit the stem section shoulder to move into engagement with the bonnet shoulder.

4. A valve of the character defined in claim 3, including a seal ring carried by the outer stem section for engaging obe bonnet bore at its outer end so as to contain lubricant in the bonnet prior to fusing of said spacing means.

5. A valve of the character defined in claim 2, wherein said venting means comprises means providing a port through the outer stem section, a closure for the port and urged toward port closing position, and means holding the closure away from port closing position and being fusible in the presence of said temperature to permit said closure to be urged to port closing position.

6. A valve of the character defined in claim 1, including spring means engaging the outer stem section to urge its shoulder against the bonnet shoulder.

7. A valve of the character defined in claim 6, wherein the spring means acts between the stem sections.

8. A valve of the character defined in claim 1, wherein said bonnet includes a base portion and a cap connected to the base portion, said seal member being carried in and said inner stem section being supported on the base section, said cap having means for holding the inner stem section down, and said bonnet shoulder being formed on the cap outwardly of the holding means.

9. A fire seal attachment for a gate valve having a bonnet base portion, a non-rising stem section having an outer end extending through the base portion, a spline on the outer end of the non-rising stem section, and a seal member of rubber-like material carried within the bonnet to seal about the non-rising stem section, said attachment comprising a cap having a hole in one end and means at the other end of connection to the base portion in surrounding relation to the outer end of the non-rising stem section, another stem section having an inner end with a spline for connection to the spline on the non-rising stem section to permit relative axial movement therebetween and an outer end which extends through the hole in the cap, an inwardly facing annular shoulder on the cap, and an outwardly facing annular shoulder on the other stem section for forming a metal-to-metal seal with the cap shoulder to close off the interior of the bonnet, whereby fluid is contained therein in the event said seal member is destroyed.

10. An attachment of the character, defined in claim 9, including means disposed between said annular shoulders and being fusible in the presence of a temperature at which said seal member is destroyed.

11. An attachment of the character defined in claim 9, including means providing a port through said other stem section, a closure for the port adapted to be urged to port closing position, and means holding the closure away from port closing position and being fusible in the presence of a temperature at which said seal member is destroyed.

12. An attachment of the character, as defined in claim 9, including a spring disposable between the non-rising stem section and the other stem section to urge said stem shoulder against said cap shoulder.

13. A fire seal attachment for a gate valve having a bonnet base portion, a stem section having an outer end extending through the base portion, and a seal member of rubber-like material carried within the bonnet to seal about the stem section, said attachment comprising a bearing part connectable to the outer end of the stem section, a spline on the bearing part, a cap having means at one end for connection to the base portion in surrounding relation to the outer end of the non-rising stem section and a hole in the other end, means on the cap for holding the bearing part against the bonnet portion to prevent axial movement of said stem section, another stem section having an inner end with a spline for connection to the spline on the bearing part to permit relative axial movement therebetween and an outer end which extends through the hole in the cap, an inwardly facing annular shoulder on the cap, and an outwardly facing annular shoulder on the other stem section for forming a metal-to-metal seal with the cap shoulder to close off the interior of the bonnet, whereby fluid is contained therein in the event said seal member is destroyed.

14. An attachment of the character defined in claim 13, including means disposed between said annular shoulders and being fusible in the presence of a temperature at which said seal member is destroyed.

15. An attachment of the character, defined in claim 13, including means providing a port through said other stem section, a closure for the port adapted to be urged to port closing position, and means holding the closure away from port closing position and being fusible in the presence of a temperature at which said seal member is destroyed.

16. An attachment of the character, defined in claim 13, including a spring disposable between the bearing part and the other stem section to urge said stem shoulder against said cap shoulder.

* * * * *